INVENTOR
ARNE HERMAN LINDQUIST

BY Hane and Nydick

ATTORNEY

United States Patent Office 3,360,241
Patented Dec. 26, 1967

3,360,241
METHOD OF MOUNTING WICKET GATES IN WATER-TURBINE PLANTS
Arne Herman Lindquist, Trollhattan, Sweden, assignor to Nydqvist & Holm Aktiebolag, Trollhattan, Sweden, a corporation
Filed Apr. 5, 1966, Ser. No. 540,298
Claims priority, application Sweden, Apr. 12, 1965, 4,778
4 Claims. (Cl. 253—122)

ABSTRACT OF THE DISCLOSURE

A mounting assemblage for a wicket gate of a water-turbine in which the wicket gate has a bearing trunnion at each end rotatably received in bearing boxes. The bearing boxes, in turn, are adjustably received in a short guide of a head cover and a bottom ring. Locating means serve to secure the bearing boxes in selected adjusted positions in reference to the head cover and the bottom ring, respectively. Auxiliary locating means permit a limited displacement of the bearing boxes in reference to the head cover and the bottom ring prior to tightening the main locating means.

---

Figure 1:
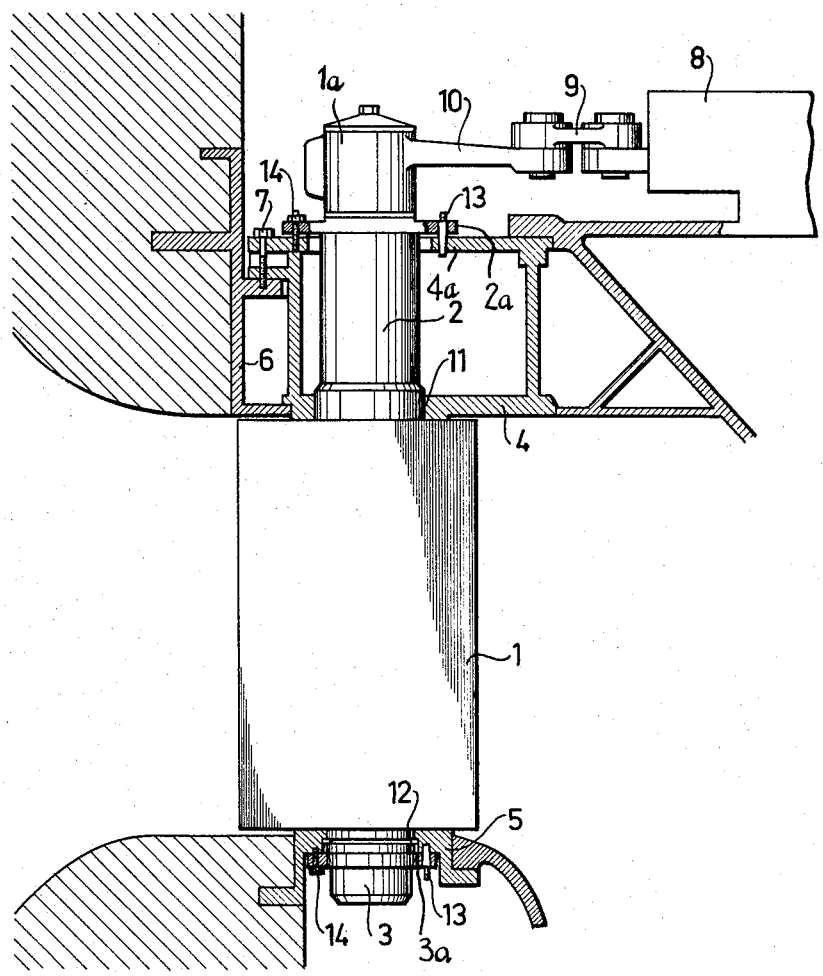

The present invention relates to an assemblage for mounting wicket gates as are used to control the flow of water to a water-turbine and thus the load on the same and also to a mounting arrangement for wicket gates. Wicket gates are operated from a gate operating ring, usually with the assistance of links and cranks or by means of servo motors, one for each wicket gate. It is possible to distinguish between an inside and an outside type of operation. The inside type, in which the gate operating ring lies within the portion of the turbine filled with water. Such ring, by means of links secured directly to the wicket gates, rotates said portion into the required position, is now seldom used and then only in small turbines. Consequently it is the outside type, the so-called externally operated wicket gate, which is most used in modern turbines. In this case the wicket gate is usually mounted at three points, a lower wicket-gate bearing in the bottom ring and two upper bearing points in the head cover. With such an arrangement, the uppermost bearing usually has more play than the other one so that it only serves as a bearing when the upper pin of the wicket gate bends slightly outwards. The wicket gate crank, by means of which the wicket gate is operated, is secured to the pin above the top bearing.

According to an earlier practice, the wicket gates were mounted directly in the bottom ring and head cover. Nowadays such mounting is only used in small turbines whereas in larger turbines cast-iron bearing boxes are used, guided in holes in the cover or in the bottom ring. These bearing boxes are secured by bolts with flange couplings. The holes and the abutment surfaces of the flanges are usually machined together in the workshop of the turbine manufacturer with the turbine more or less fully assembled. However, as large portion of the turbine, subsequent to assembly, are embedded in concrete, certain deformations often appear when said concrete hardens, and consequently the wicket gates may be jammed in their bearing positions. This problem has become more prevalent due to the practice of positioning the support bearings of the turbine in the head cover, whereby the same is subjected to distortion which is difficult to determine in advance and which causes an error in the angle between the center lines of the wicket gate pin and the bearing box.

This disadvantage has been remedied by individually scraping each bearing; a process which in addition to being expensive and time wasting also prevents the bearing boxes from being changed, thus causing a prolonged standstill time when the turbine is overhauled. It is possible to solve the problem by machining the holes for the bearing boxes after the turbine has been assembled on its site, but this method is very expensive due to the fact that the equipment available in the field is inferior to that in the workshop, and is for the most part incapable of being carried out since too much time would be required for assembly.

The above problem is solved by the assemblage according to the present invention, said assemblage eliminating all of the difficulties mentioned.

Figure 2:
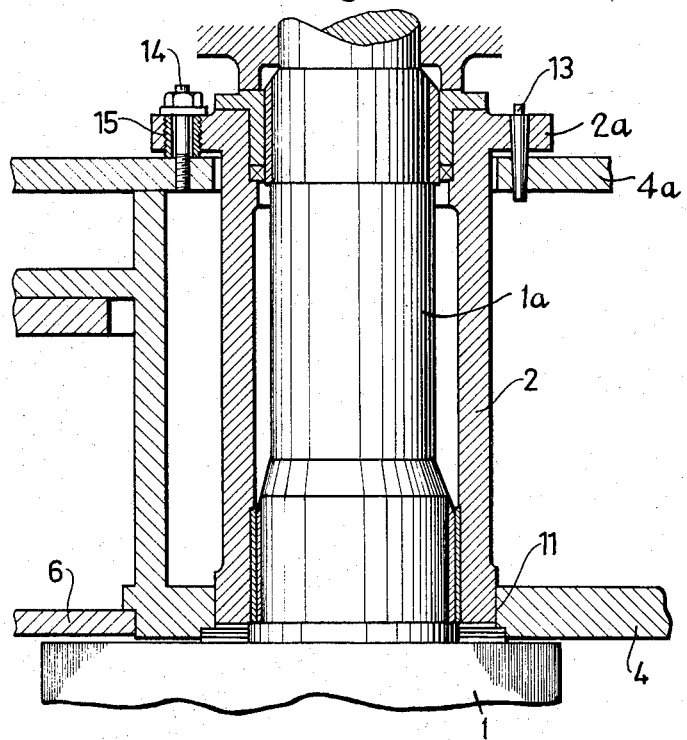
Figure 3:
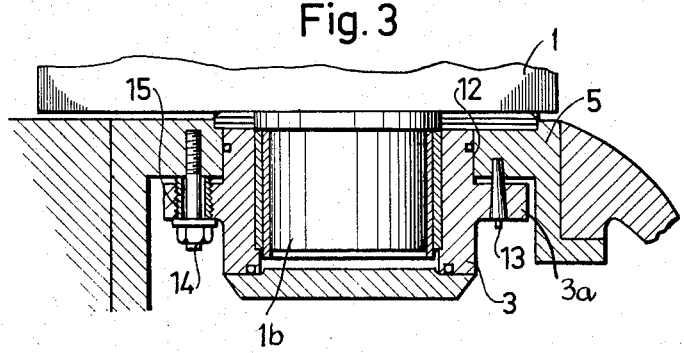

The invention is more fully described in connection with the accompanying drawing where FIG. 1 shows the bearing of a wicket gate in a vertical section through said wicket gate, and FIGS. 2 and 3 show upper and lower bearing boxes in vertical section.

The wicket gate 1 shown in FIG. 1 controls, together with other wicket gates included in the gate mechanism, the flow of water to a turbine (not shown) to the right in the figure. Trunnions 1a and 1b of the wicket gates are mounted in double bearings in an upper bearing box 2 and in a single bearing in a lower bearing box 3. The upper bearing box is supported by a head cover 4 and the lower bearing box by a bottom ring 5. The head cover 4 is supported on an upper stay ring 6 and is secured to the same by means of bolts 7. Each wicket gate is opearated by a gate operating ring 8 coupled to the gates by a link 9 and a gate crank 10.

The bearing boxes 2 and 3 are movably supported in a very short guide 11 and 12, respectively in the head cover and bottom ring, respectively so that they are free to adjust themselves appropriately when the turbine is being assembled. After the turbine has been assembled and the concrete in which the turbine has been embedded, has hardened, the boxes are fixed in position by means of conical guide pins 13 which are driven through holes in flanges 2a and 3a, respectively, on the bearing boxes and holes in the head cover or bottom ring, respectively, the bearing boxes thereafter being secured by means of screws 14. To facilitate adjustment and alignment of the positions of the bearing boxes prior to securing the same by means of pins 13, outwardly-threaded sleeves 15 are screwed into the holes in the flanges until they abut the head cover and bottom ring. These sleeves receive, with large clearance, the screws 14 secured into the head cover and bottom ring. As is evident, the clearance in sleeves 15 permits a limited movement of the gearing boxes in reference to head cover 4 and bottom ring 5, respectively, prior to the insertion of locating pins 13.

I claim:
1. A mounting assemblage for a wicket gate of a water turbine, said assemblage comprising, in combination, a wicket gate having a bearing trunnion at each end, an upper bearing box and a lower bearing box rotatably seating said trunnions, a head cover and a bottom ring each including a short guide for adjustably receiving said bearing boxes, and locating means for securing said bearing boxes in selected adjusted positions in reference to said head cover and bottom ring, respectively.

2. A mounting assemblage according to claim 1, wherein each of said bearing boxes has a flange radially extending therefrom, and wherein said locating means comprise a locating pin for each of said bearing boxes, said pins being receivable in holes in the bearing boxes and the flanges.

3. A mounting assemblage according to claim 1, and comprising an auxiliary locating means for each of the bearing boxes, each of said auxiliary locating means including a receiving sleeve fitted in the respective bearing box and a fastening member extending with play through the respective sleeve into the head cover and the bottom ring, respectively, to permit a limited displacement of the bearing boxes in reference to the head cover and the bottom ring prior to securing said locating means.

4. A mounting assemblage according to claim 3, wherein said sleeves are externally threaded and screwed into the bearing boxes and each of said fastening members comprises a screw bolt screwed into the head cover and the bottom ring, respectively.

References Cited

UNITED STATES PATENTS 2,930,579   3/1960   Boyd et al. _____ 253—24

EVERETTE A. POWELL, JR., *Primary Examiner.*